UNITED STATES PATENT OFFICE 2,277,243

AZO DYESTUFFS

Gottfried Manz, Cologne-Mulheim, Germany, assignor to General Aniline & Film Corporation, a corporation of Delaware No Drawing. Application November 16, 1937, Serial No. 174,829. In Germany November 21, 1936

5 Claims. (Cl. 260—205)

The present invention relates to new water-soluble azodyestuffs and to the method of preparing the same; more particularly it relates to azodyestuffs which may be represented by the general formula:

A—N=N—B

In this formula A and B stand for aromatic radicals of which B bears the group

wherein R stands for hydrogen or alkyl and R' stands for —alk—O—P(OH)$_2$ or

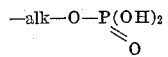

alk meaning an alkylene radical. Besides the radicals of phosphorus or phosphoric acid no further acid radicals, such as carboxylic acid or sulfonic acid groups, are present in the dyestuffs.

My new dyestuffs are obtainable by coupling diazo compounds with such aromatic amines in which one hydrogen atom of the amino group is substituted by a hydroxyalkyl radical, which has been esterified with phosphorus or phosphoric acid to an acid ester, and in which the other hydrogen atom of the amino group may be substituted by an alkyl radical. The diazo as well as the coupling components are selected in such a manner that they contain besides the phosphorus or phosphoric acid radicals no further acid groups in the molecule, as for instance, the carboxylic acid or the sulfonic acid group. Other radicals, however, such as the nitro group, the alkylsulfone group, alkyl, alkoxy and halogen radicals, may be present.

The coupling components, aromatic amines substituted in the amino group as described above, are obtainable by causing N-hydroxy-alkylated aromatic amines to react with phosphorus tri-halides or with phosphorus oxy-halides or phosphorus pentoxide, if desired, in an indifferent solvent and then hydrolyzing the reaction products thus obtained to mono-esters of the phosphorus or phosphoric acid.

My new dyestuffs may also be obtained by converting such azodyestuffs, as contain in the coupling component a hydroxyalkyl-amino group or a hydroxyalkyl-alkyl-amino group, into the acid esters of the phosphorus or phosphoric acid.

The dyestuffs of the present invention are soluble in water and are in general suitable for dyeing wool, silk and especially cellulose acetate artificial silk. They dye cellulose acetate artificial silk from the Glauber's-salt-bath, yellow, orange, red and violet shades and, compared with the known watersoluble dyestuffs for cellulose acetate artificial silk, they show in part an improved fastness to water and washing; further, they dye more thoroughly crepe-tissues of cellulose acetate artificial silk than the mentioned water-soluble dyestuffs.

The following examples illustrate the invention without being restricted thereto:

Example 1

13.8 gms. of p-nitraniline are suspended in 100 ccs. of water and, after the addition of 6.9 gms. of sodium nitrite, diazotized at room temperature by the addition of 28 ccs. of hydrochloric acid of 19.5° Bé. The diazo solution thus obtained is added at about 5° C. to the solution weakly acid with acetic acid of the acid phosphorus acid ester which has been obtained by reacting upon 15.1 gms. of hydroxy-ethyl-methyl-aniline with the corresponding quantity of phosphorous trichloride. Coupling is completed by the addition of a sodium acetate solution until acid with acetic acid.

There is obtained a red powder which is filtered with suction and then dried at a moderate temperature. It is of good solubility in water and dyes cellulose acetate artificial silk from an aqueous bath in the presence of Glauber's-salt yellowish scarlet shades. The dyestuff, which corresponds to the following formula:

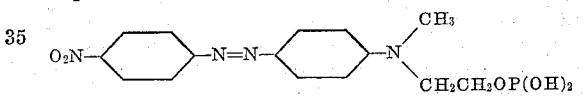

shows a good fastness to washing, a good dischargeability and thoroughly dyes bark-crepe from cellulose acetate artificial silk. (Bark-crepe stands for "Borkenkrepp.")

When using as diazotization component the 2-chloro-4-nitraniline, there are obtained bluish-red shades of similar properties.

When using in the preceding combinations as coupling component the acid phosphorous acid ester prepared from hydroxyethyl-ethyl-aniline, there are obtained dyestuffs of similar shades and properties.

Example 2

A diazo solution, which corresponds to 13.8 gms. of p-nitraniline, which is obtained as indicated in Example 1, is combined with the acetic acid aqueous solution of the acid phosphorous acid ester prepared from 20.7 gms. of n-butyl-hydroxy-ethyl-3-toluidine. Coupling is completed by the addition of a sodium acetate solution until acid with acetic acid.

The dyestuff separates as a red powder. It is filtered with suction and then dried at moderate temperature. The dye-stuff, which corresponds to the following formula:

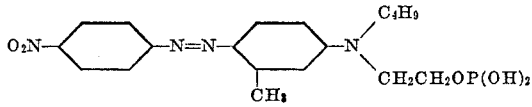

and which is soluble in water, dyes cellulose acetate artificial silk in the presence of Glauber's-salt bluish-red shades. The dyeings show a good fastness to washing and a good dischargeability; the dyestuff thoroughly dyes bark-crepe from cellulose acetate artificial silk.

When using 2.4-dinitraniline there is obtained a dyestuff which dyes cellulose acetate artificial silk bluish-ruby shades.

*Example 3*

30.7 gms. of 6-bromo-2.4-dinitraniline are dissolved in 80 ccs. of sulfuric acid of 66° Bé. and diazotized with the calculated quantity of nitrosyl sulfuric acid. The diazotization mixture is poured into an aqueous solution of the acid phosphorous acid ester, which has been obtained by reacting upon 23.7 gms. of n-butyl-hydroxy-ethyl-cresidine with phosphorous trichloride, and simultaneously neutralizing with caustic soda lye. Coupling is soon completed.

The dyestuff separates as a blackish-violet powder which dyes cellulose acetate artificial silk from an aqueous bath in the presence of Glauber's-salt violet shades.

The dyestuff corresponds to the following formula:

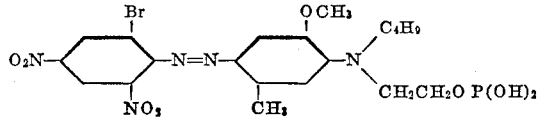

When using 2.4-dinitraniline there is obtained a reddish-violet dyestuff.

*Example 4*

17.2 gms. of 2-chloro-4-nitraniline are diazotized as indicated in Example 1. After coupling in dilute acetic acid solution with the acid phosphoric acid ester, which has been obtained from 15.1 gms. of hydroxyethyl-methyl-aniline and the equivalent quantity of phosphorous oxychloride, there is obtained after working up, as indicated in Example 1, a water-soluble dyestuff of the following constitution:

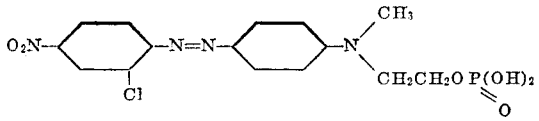

which dyes cellulose acetate articial silk from an aqueous bath in the presence of Glauber's-salt bluish-red shades.

When using the acid phosphoric acid ester prepared from n-butyl-hydroxyethyl-3-toluidine, there is obtained a ruby shade.

*Example 5*

30 gms. of the dry dyestuff of the constitution:

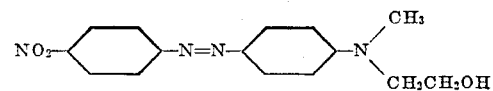

are dissolved in 300 ccs. of methylenechloride and added to 15 ccs. of phosphorous trichloride. The mixture is heated for some hours to boiling, whereby the dyestuff separate as a dark crystalline substance. Then the methylenechloride solution is decanted and the dyestuff is digested with a dilute aqueous sodium carbonate solution.

There is obtained a watersoluble dyestuff which is esterified in the hydroxyalkyl group of the coupling component to an acid ester of phosphorous acid. It dyes cellulose acetate artificial silk scarlet shades. The dyeings are similar to those described in Example 1.

Further dyestuffs analogous to those described in the above examples are given in the following table:

| Diazotization component | Coupling component | Shade |
| --- | --- | --- |
| 2.4-dinitraniline | Acid phosphorus acid ester of hydroxy-ethyl-aniline. | Bordeaux. |
| 6-bromo-2.4-dinitraniline. | do | Ruby. |
| 2-chloro-4-nitraniline | Acid phosphorus acid ester of n-butyl-hydroxyethyl-3-toluidine. | Bluish-ruby. |
| p-Nitraniline | Acid phosphoric acid ester of hydroxy-ethyl-methyl-aniline. | Yellowish-scarlet. |
| p-Nitraniline | Acid phosphoric acid ester of n-butyl-hydroxyethyl-3-toluidine. | Bluish-red. |
| Do | Acid phosphorus acid ester of 1-hydroxy-ethyl-naphthylamine. | Bluish-bordeaux. |
| Do | Acid phosphorus acid ester of 2-hydroxy-ethyl-naphthylamine. | Bordeaux. |
| 6-bromo-2.4-dinitraniline. | do | Violet. |
| 2-amino-6-ethoxybenzothiazole. | Acid phosphorus acid ester of hydroxyethyl-n-butyl-cresidine. | Bluish-pink. |
| Do | Acid phosphorus acid ester of hydroxyethyl-ethyl-3-toluidine. | Pink. |
| 1-aminonaphthalene-4-methylsulfone. | Acid phosphorus acid ester of hydroxyethyl-methyl-aniline. | Reddish-orange. |
| Do | Acid phosphorus acid ester of hydroxyethyl-ethyl-3-toluidine. | Yellowish-red. |

I claim:

1. Watersoluble azo dyestuffs of the general formula:

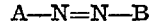

wherein A and B stand for aromatic radicals selected from the group consisting of radicals of the benzene and naphthalene series of which B bears the group

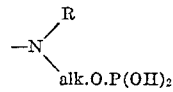

in which R stands for a radical selected from the group consisting of hydrogen and alkyl and alk means an alkylene radical, these dyestuffs being free from carboxylic acid and sulfonic acid groups and dyeing cellulose acetate artificial silk various shades of good fastness properties.

2. Watersoluble azodyestuffs of the general formula:

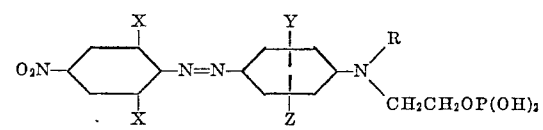

wherein R stands for a member selected from the group consisting of hydrogen and alkyl, one X stands for a member selected from the group consisting of hydrogen and the nitro group and the other X stands for a member selected from the group consisting of hydrogen and halogen, Y stands for a radical selected from the group consisting of hydrogen and alkoxy, and Z stands for a member selected from the group consisting of hydrogen and alkyl, dyeing cellulose acetate artificial silk various shades of good fastness properties.

3. The azodyestuff of the formula:

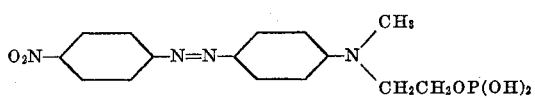

dyeing cellulose acetate artificial silk scarlet shades of good fastness properties.

4. The azodyestuff of the formula:

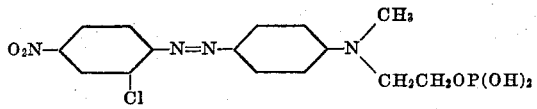

dyeing cellulose acetate artificial silk bluish red shades of good fastness properties.

5. The azodyestuff of the formula:

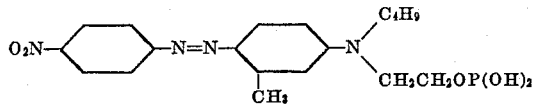

dyeing cellulose acetate artificial silk bluish red shades of good fastness properties.

GOTTFRIED MANZ.